United States Patent
Saltykov et al.

(10) Patent No.: US 10,655,412 B2
(45) Date of Patent: May 19, 2020

(54) ELECTRO-HYDRAULIC COMPLEX WITH A PLASMA DISCHARGER

(71) Applicant: ILMASONIC-SCIENCE LIMITED LIABILITY COMPANY, Moscow (RU)

(72) Inventors: Alexandr Alexeevich Saltykov, Schelkovo (RU); Yuriy Alexeevich Saltykov, Moscow (RU); Vladimir Renovich Genrikhson, Kaluga (RU)

(73) Assignee: ILMASONIC-SCIENCE LIMITED LIABILITY COMPANY, Moscow (RU)

( * ) Notice: Subject to any disclaimer, the term of this patent is extended or adjusted under 35 U.S.C. 154(b) by 0 days.

(21) Appl. No.: 16/326,941

(22) PCT Filed: Aug. 18, 2017

(86) PCT No.: PCT/RU2017/050077
§ 371 (c)(1),
(2) Date: Feb. 21, 2019

(87) PCT Pub. No.: WO2018/038647
PCT Pub. Date: Mar. 1, 2018

(65) Prior Publication Data
US 2019/0211640 A1 Jul. 11, 2019

(30) Foreign Application Priority Data
Aug. 24, 2016 (RU) ................................ 2016134600

(51) Int. Cl.
*E21B 7/24* (2006.01)
*E21B 28/00* (2006.01)
(Continued)

(52) U.S. Cl.
CPC ............ *E21B 28/00* (2013.01); *E21B 43/003* (2013.01); *E21C 37/18* (2013.01); *G01V 1/157* (2013.01); *G10K 15/043* (2013.01)

(58) Field of Classification Search
CPC combination set(s) only.
See application file for complete search history.

(56) References Cited

U.S. PATENT DOCUMENTS 2,823,792 A * 2/1958 Lord ....................... B21F 23/00
226/11
5,301,169 A    4/1994 Baria et al.
(Continued)

*Primary Examiner* — Cathleen R Hutchins
*Assistant Examiner* — Ronald R Runyan
(74) *Attorney, Agent, or Firm* — Dmitry S. Kryndushkin; IP Center Skolkovo

(57) ABSTRACT

An equipment for stimulating increased oil recovery is described. The complex is most suitable for operations in wells where natural flow and gas-lift recovery methods are used, and also for combined treatment of bottom-hole formation zones together with acoustic (ultrasonic) emitters. The complex consists of two main parts: a surface power supply and control unit, and a downhole electro-hydraulic instrument consisting of a boosting inverter unit a capacitor unit and a plasma discharger. Said instrument has a diameter less than 52 mm, allowing the instrument to pass freely through all existing production tubing. The instrument has a modular structure, making it possible to build up the power of the plasma discharge from 0.5 to 3 kJ. The plasma discharger is designed to be easily disassembled for replacement of electrodes and installation of a new spool with a wire, the discharger having a mechanical drive of a wire feeding unit, set in motion by a piston mechanism that is powered by a high pressure pulse produced by the discharger itself. Using the equipment for increase in efficiency and cost-effectiveness of oil recovery enhancement operations when working through tubing.

4 Claims, 2 Drawing Sheets

(51) Int. Cl.
*G01V 1/157* (2006.01)
*E21B 43/00* (2006.01)
*E21C 37/18* (2006.01)
*G10K 15/04* (2006.01)

(56) References Cited

U.S. PATENT DOCUMENTS

| | | |
|---|---|---|
| 5,903,518 A | 5/1999 | Benwell et al. |
| 6,427,774 B2 * | 8/2002 | Thomas ............... E21B 43/003 166/248 |
| 2012/0043075 A1 | 2/2012 | Abramova et al. |

* cited by examiner

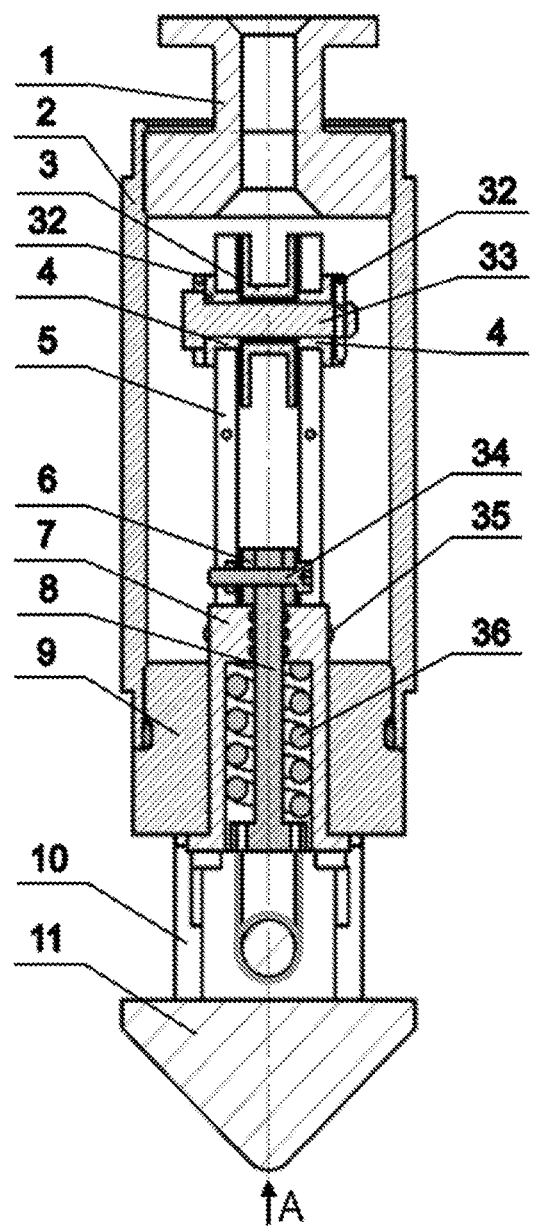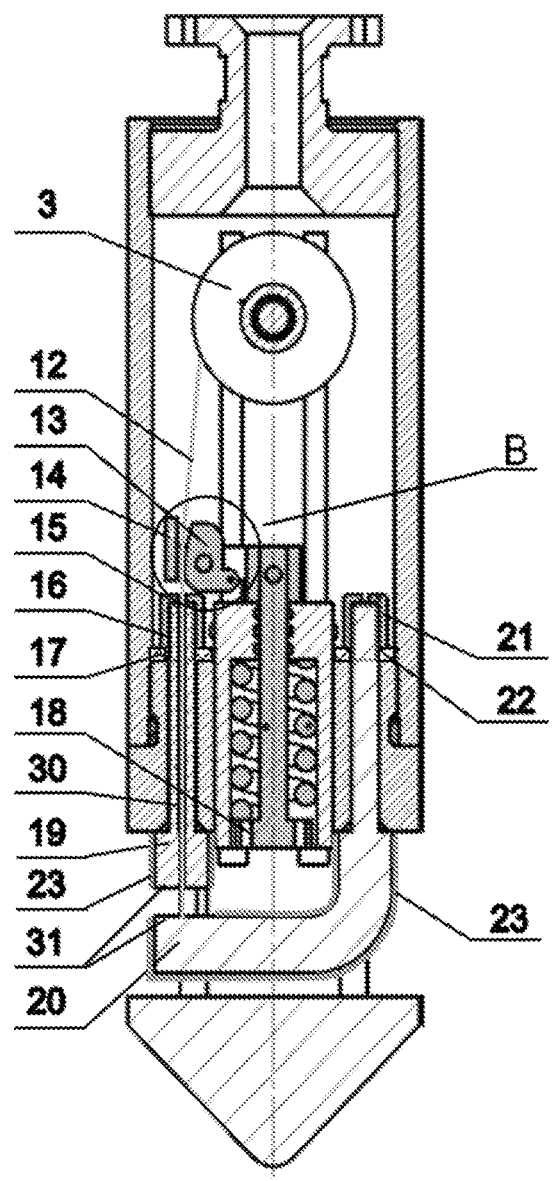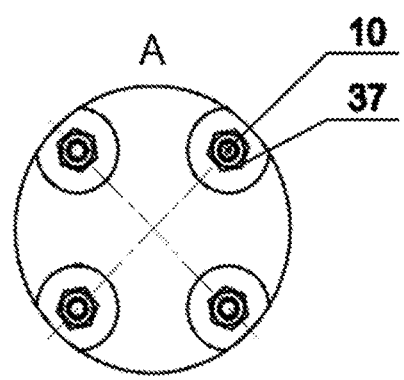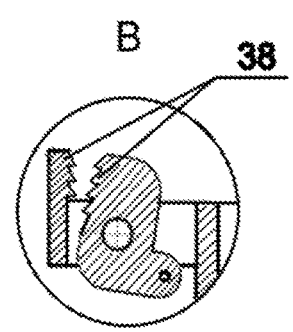
Fig. 2A
Fig. 2B

ELECTRO-HYDRAULIC COMPLEX WITH A PLASMA DISCHARGER

TECHNICAL FIELD OF THE INVENTION

The invention relates to the field of oil production, in particular, to equipment for stimulating enhanced oil recovery. This complex is most applicable when working on oil wells where free-flow and gas-lift oil extraction methods are used, as well as in comprehensive treatment of the bottom-hole zone along with the sound-emitting (ultrasonic) radiators.

BACKGROUND OF THE INVENTION

From the first day of its discovery electrohydraulic effect has been and still remains a constant source of a number of innovative technological processes that are now widely used worldwide [1] in various industries. The use of electrohydraulic technology in oil production is also efficient. References [2-4] dealing with seismoacoustic technology show that low-frequency oscillations are beneficial to oil recovery. Electrohydraulic devices were first used within the seismic-acoustic technology in 1992.

The downhole devices diameter of current electrohydraulic equipment designed to work in oil and gas wells is 102 mm [5-8]. There is also a device with 69.9 mm in diameter and 11.8 m length [9]. Thus, due to their dimensions, these devices can only be operated through casing (capital string). At the same time, all existing methods of oil production (free-flow, gas-lift, pump) involve using of tubing.

Removing and running-in of the tubing is a fairly laborious process, other than time and cost it entails tubing resource (wire connections) reduction. In oil-wells where the pump oil recovery method is used the above-listed downhole devices can be used in the course of basic well servicing or total overhaul, when the tubing is removed anyway, and the work can be carried out through the casing. However, removing of the casing from wells with free-flow and gas-lift methods of oil production is inexpedient, especially in offshore wells. In that case it is appropriate to apply an electrohydraulic device with external diameter not exceeding 52 mm for stimulation of the oil reservoir. This provides the possibility of using it with almost all the existing tubings, because the most common tubings are those with a diameter of 60-89 mm.

A device consisting of a surface power source and a downhole device is also known [8]. The downhole device is made in the form of a hollow cylinder case divided with partitions into airtight sections, contains electrically interconnected charging apparatus, block of storage capacitors and a discharge unit with electrodes. The apparatus also has a commutation device mounted in its cavity, which is connected to a control board and a power source, and it operates automatically. The commutation device is in the same section as the block of storage capacitors, and the section where the block of storage capacitors and the commutation device are fixed is filled with electrically insulating medium. DC voltage is applied from the surface power source to the charging apparatus. The block of storage capacitors is charged to the required voltage value with capacitors being connected in parallel and then discharged, which ensures the supply of the output voltage to the electrodes of the discharge unit. After the charging of the block is over storage capacitors are switched to the serial connection. Then the block of storage capacitors is discharged providing an increase in its output voltage in stepped proportion to the number of capacitors. The DC voltage applied to the charger is set within the range of 300-150 V. The maximum value of the required voltage for charging the block of storage capacitors is taken equal to 20-27 kV.

Due to the use of complex electric circuit and to the need to charge the capacitors up to the voltage of 20-27 kV such downhole device has large dimensions—the diameter of 102 mm and the length not less than 2500 mm.

A device [6, 7] with all the necessary components and elements is known: energy storage units, electric ignition circuits, feeding unit for feeding metal wire to the working interelectrode space. The feeding unit consists of the housing, high-voltage electrode unit, low-voltage electrode unit in which there is a supply port for feeding the wire to the interelectrode space. The housing has the main part, the end part and jumpers connecting the parts specified above. The specified parts of the housing are formed as an integral unit. The high-voltage electrode unit is in the main part of the housing. The low-voltage electrode unit is in the end of the housing. The housing wall has a through hole going through the main part, the jumper and the end part. The hole is for the electrical wiring. The high-voltage electrode unit of the downhole source of seismic energy contains an electrode, two discs made of dielectric material, a bushing, a taper bushing. The low-voltage electrode unit of the downhole source of seismic energy contains a contact member, a toothed bushing with a tapered portion, and a guide tube.

Patents [6, 7] contain a detailed description of electrode design and no description of the operation of energy storage units, that of the electric ignition circuit and the wire feed unit. But judging by the fact that the above downhole devices have a diameter of 102 mm, all the proposed devices have large dimensions.

There is also known the borehole source of elastic vibrations [5] we took as the prototype, which consists of a downhole device with an energy storage unit, charging unit, discharger with ignition circuit, electropulse discharger with two electrodes, feeding unit for feeding metal wire to the working interelectrode space in it. The feeding unit consists of reel for the wire, and the tread drive. The wire drive is made in the form of two metal plates with one side of each of them fixed on the opposite sides of the bar. The opposite pointed sides of the plates are pressed by a spring to the wire on the guide platform and oriented at an angle thereto, the angle providing for the platform's rotary engagement and movement towards the interelectrode space with the reciprocal motion of the rod connected by an axis and pull lines to the movable armature of the solenoid. The rod and the pull lines connected to the armature of the solenoid are connected by an axis going through a hole in a dielectric plate. The downhole device has a relay. The discharge circuit of the storage capacitors of the downhole device has Rogowski coil.

The diameter of the downhole tool of the prototype under consideration is also 102 mm, which is due to the large dimensions of the wire feeding unit. The solenoid and additional equipment to enable it to work is used as a drive for pulling the wire, which reduces the reliability of the drive and the operation of the borehole tool in general.

SUMMARY OF THE INVENTION

The aim of the present invention is to improve the efficiency and performance of enhanced oil recovery stimulation procedure when working through tubing. Efficiency stands for the possibility of well treatment without stopping oil production in gas lift and free-flow oil wells. Performance stands for reduction of costs for the procedure.

The technical result is increasing oil recovery and cleaning the bottom zone.

The claimed technical result is ensured by the fact that the electrohydraulic complex with a plasma discharger comprises a surface power supply and control unit, downhole electrohydraulic device, plasma discharger, electrodes, metal wire feeding unit, and the downhole electrohydraulic device is made as a modular structure and consists of a boosting inverter unit, block of capacitors and plasma discharger, and the plasma discharger consists of a housing with inner cavity, with the upper part connected to a coupling bushing, and the lower part connected to a bearing sleeve, the housing cavity contains a cylinder mounted on the middle part of the bearing sleeve, and the cylinder has a piston with a rod and a spring, the wire feeding unit made in the form of a lever with a support platform and a wing with a spring is mounted on the top of the piston, on the support platform and on the wing on the side facing the wire there are directed notches, and four rods are fixed to the cylinder, that are the basis for the mount fitting of the coil, in the bearing sleeve there are holes for fixing the positive and negative electrodes, and the electrodes are insulated with open areas providing for plasma discharge, in the negative electrode there is an axial hole for the wire, at the bottom of the bearing sleeve there is a guide cone fixed to it by means of racks.

In a specific case of implementation of the claimed technical solution capacitors in the block of capacitors are connected in parallel.

In a specific case of implementation of the claimed technical solution the bearing sleeve is made of glass-fiber plastic.

In a specific case of implementation of the claimed technical solution the piston is made with holes equalizing the pressure of the head-end volume and the pressure in the oil well.

In a specific case of implementation of the claimed technical solution the wire feeding unit is a limiter holding the piston in the required position.

Firstly, due to the fact that continuous oil production contributes to the extraction of mud, which inevitably flakes off when exposed to electro-hydraulic impact of the casing and the deposit rock in the bottom-hole area. It also results in the additional effect of increasing oil flow rate in the well, i.e. contributes to the intensification of oil production.

Secondly, the cost reduction takes place due to exclusion of procedures of removing and subsequent running-in of the tubing, as well as to compensation of a part of costs through continuing oil production in the course of treatment. All this is impossible when using other electrohydraulic devices.

BRIEF DESCRIPTION OF THE DRAWINGS

Details, features and advantages of the present invention are apparent from the following description of implementation of the claimed technical solution and the drawings showing the following:

FIG. 2—schematic drawing of the discharger of the downhole electrohydraulic device in two projections (FIG. 2A and FIG. 2B—two different plane cuts).

Figure 1:
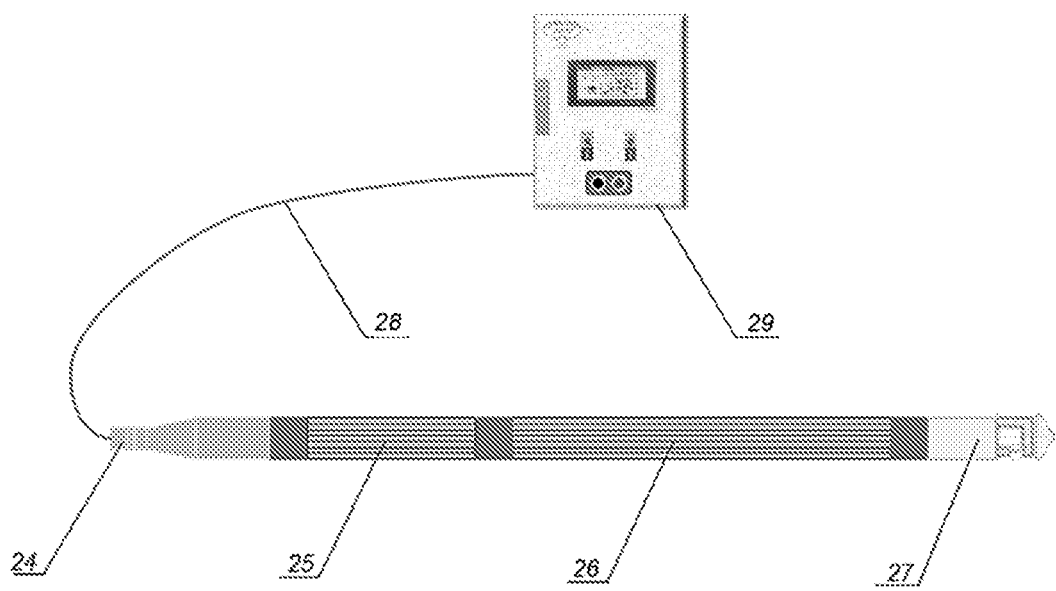
FIG. 1—diagrammatic sketch of the downhole electrohydraulic device.

In the figures the parts are marked by numerals as follows: 1—coupling bushing, 2—housing, 3—coil, 4 attaching unit of the coil, 5—support rod, 6—wire feeding mechanism, 7—cylinder, 8—piston with a rod, 9—glass-fiber plastic bearing sleeve, 10—racks for cone mounting, 11—guide cone, 12—wire, 13—wing with a spring, 14—support platform, 15—sealing insert, 16—negative electrode-fixation; 17—negative electrode terminal, 18—equalizing hole; 19—negative electrode, 20—positive electrode, 21—positive electrode fixation, 22—positive electrode terminal, 23—electrode insulation; 24—cable lug head; 25—boosting inverter unit; 26—block of capacitors; 27—plasma discharger, 28—geophysical cable; 29—surface power supply and control unit; 30—axial hole in the negative electrode for passage of the wire; 31—non-insulated (open) areas of the electrodes configured to provide a plasma discharge; 32—screw for fastening the attaching unit of the coil to the support rod; 33—axis of the coil; 34—axis of attachment of the wire feeding mechanism to the piston rod; 35—screw securing the support rod to the cylinder; 36—piston return spring; 37—nut attaching the guide cone to cone mounting racks, 38—directional notches.

DETAILED DESCRIPTION OF THE INVENTION

Structurally, the electrohydraulic complex with plasma discharger consists of two main parts: surface power supply and control unit and downhole electrohydraulic device. The downhole electrohydraulic device has a modular structure (FIG. 1), which consists of boosting inverter unit (25), capacitors unit (26) and plasma discharger (27). Its length does not exceed 3 meters and its diameter does not exceed 52 mm, which provides easy access of the device to all the existing tubings.

In the boosting inverter unit (25) supply voltage is converted to constant high voltage. Because the input supply voltage conversion is performed at high frequency, the step-up decoupling transformer which is a part of the boosting inverter has small dimensions. In the capacitors unit (26) capacitors are used one in which one lead is a coaxial pin, and the other lead is a cylindrical body, thus, capacitors are connected into a shunt bank by simple pins fixing. Such structure takes up minimum of space and allows using small-sized components.

The modular structure allows increasing the capacity of the downhole electrohydraulic device through the use of additional blocks of capacitors, in the proper range, e.g., from 0.5 to 3 kJ. Modular structure is ensured through the use of rubber-plastic connection strengthened with cables.

A special role is played in the invention by the plasma discharger design. Unlike the prototype, it has a mechanical drive instead of electric one. It is designed as a modular, easy to disassemble design, which makes it easy to replace any parts, and install a new spool of wire, which is particularly important in the field. Discharger body (2) is screwed onto coupling bushing (1) and fixed with a screw. At the bottom of the discharger body there is bearing sleeve (9) made of glass-fiber plastic, to which all the other elements are attached.

In the middle part of the sleeve cylinder (7) is screwed in, in which there is piston (8) with a rod and a spring. In piston (8) there are small holes (18) for equalizing pressure of the head-end volume and the pressure in the oil well. On the top of piston (8) there is wire feeding mechanism (6), which is at the same time a limiter to hold the piston in the required position. The feeding mechanism is lever with a support platform (14) and wing with a spring (13). On the support platform and on the wing on the side facing wire (12), there are directed notches, allowing the feeding mechanism to move up without affecting the wire, and providing engagement with the wire when it moves down.

4 rods (5) are attached to cylinder (7), that are the basis for attachment unit (4) of coil (3). The rods also ensure that the cylinder does not get knocked out of sleeve (9) by piston (8), due to being mounted on coupling bushing (1).

Bearing sleeve (9) has 2 holes for fixing electrodes (17, 18). The electrodes have insulation (23) eliminating the possibility of backstreaming. Open areas are only those providing for plasma discharge. Power cable is connected to positive electrode (20) with terminal (22) and screw bolt (21). Power cable is also connected to negative electrode (19), but there is an axial hole in the electrode made for wire (12). Sealing insert (15) is used to seal the hole.

Guide cone (11) is attached to the bottom of the bearing sleeve with racks (10). It ensures free movement of the downhole electrohydraulic device in the tubing, and, at the same time, along with the racks, it protects the electrodes from mechanical impact.

The electrohydraulic complex operates as follows:

Surface power supply unit is connected to 220 V AC network, converts it to direct current and passes it on the geophysical cable to the boosting inverter unit and the block of capacitors. Electrical energy is accumulated in capacitors and once they are full plasma discharge occurs through electrodes (19, 20), connected by wire (12), which is preset in the required position.

Plasma discharge results in electrohydraulic shock affecting the oil reservoir and the bottomhole zone, which contributes to the stimulation of enhanced oil recovery and oil production intensification.

The shock wave also impacts piston (8), which goes up, compresses the spring and moves wire feeding mechanism (6). The surfaces of support platform (14) and wing (13) easily slide upwards on wire (12). When the spring is straightened the feeding mechanism is lowered and due to the special notches on the support platform and the wing, and the springs of the wing, providing its pressing, pull the wire down through the negative electrode until it contacts the positive electrode. Then the whole cycle is repeated.

REFERENCES

1. L. A. Yutkin. Electrohydraulic effect and its application in industry. Leningrad: Mechanical engineering, Leningrad Dep., 1986, 253 p.
2. O. L. Kuznetsov, E. M. Simkin, J. Chilingar. Physical basis of vibration and acoustic impact on the oil and gas reservoirs, 2001, 260 p.
3. O. L. Kuznetsov, I. A. Chirkin, Yu. A. Kuryanov et al. Seismoacoustics of porous and fractured geological media, 2007, 432 p.
4. Yu. V. Revizskiy, V. P. Dyblenko. Study and validation of the mechanism of oil recovery using physical methods. Moscow, Nedra publishing house, 2002, 300 p.
5. U.S. Pat. No. RU 2,248,591, Borehole source of elastic vibrations, 2004.
6. U.S. Pat. No. RU 2,385,472, Well source of seismic energy, unit of high voltage electrode and unit of low voltage electrode, 2007.
7. U.S. Pat. No. RU 2,373,386, Method for action at well bottom zone and oil-saturated beds (versions) and device for its realisation, 2008.
8. Patent No. US 2012/0043075, Method and assembly for recovering oil using elastic vibration energy, 2012.
9. http://www.bluesparkenergy.net/wasp/#applications

The invention claimed is:

1. An electrohydraulic complex with a plasma discharger comprising a surface power supply and control unit, a downhole electrohydraulic device, electrodes, a metal wire feeding unit, characterized in that the downhole electrohydraulic device has a modular structure and consists of a boosting inverter unit, at least one block of capacitors and the plasma discharger, wherein the plasma discharger consists of a housing with an internal cavity, with an upper part of the housing being connected to a coupling bushing, and a lower part of the housing being connected to a bearing sleeve;

the housing internal cavity contains a cylinder mounted on a middle part of the bearing sleeve, and the cylinder has a piston with a rod and a return spring;

the wire feeding unit is made in a form of a lever with a support platform and a wing with a spring, said wire feeding unit is mounted on an upper part of the piston, and directional notches are made on the support platform and on the wing on a side facing a wire;

four support rods are attached to the cylinder, which form an attaching unit of a coil;

holes are made in the bearing sleeve for fixation of positive and negative electrodes, said electrodes being insulated except for open areas configured for providing a plasma discharge;

an axial hole for the wire is made in the negative electrode;

a guide cone is mounted at a bottom of the bearing sleeve by means of racks;

the piston is made with at least one hole that equalizes pressure of a head-end volume and a well pressure.

2. The electrohydraulic complex according to claim 1, wherein capacitors in the block of capacitors are connected in parallel.

3. The electrohydraulic complex according to claim 1, wherein the bearing sleeve is made of a glass-fiber plastic.

4. The electrohydraulic complex according to claim 1, wherein the wire feeding unit is a limiter that holds the piston in a predetermined position.

* * * * *